US007857228B2

United States Patent
Chiang et al.

(10) Patent No.: US 7,857,228 B2
(45) Date of Patent: Dec. 28, 2010

(54) TV CARD WITH POWER-SWITCHING FUNCTION

(75) Inventors: Cheng-Chia Chiang, Chung Ho (TW);
Chien-Chung Chiang, Chung Ho (TW);
Chien-Ming Yeh, Chung Ho (TW);
Yuichiro Kuga, Chung Ho (TW)

(73) Assignee: Avermedia Technologies, Inc., Chung Ho, Taipei Hsien (TW)

( * ) Notice: Subject to any disclaimer, the term of this patent is extended or adjusted under 35 U.S.C. 154(b) by 358 days.

(21) Appl. No.: 12/015,613

(22) Filed: Jan. 17, 2008

(65) Prior Publication Data
US 2009/0147136 A1 Jun. 11, 2009

(30) Foreign Application Priority Data
Dec. 6, 2007 (TW) .................. 96146609 A

(51) Int. Cl.
*G06K 19/06* (2006.01)
(52) U.S. Cl. ..................................... 235/492
(58) Field of Classification Search .................. 235/492
See application file for complete search history.

(56) References Cited

U.S. PATENT DOCUMENTS 6,607,139 B1 * 8/2003 Jui-Chang et al. ........... 235/492
2006/0124755 A1 * 6/2006 Ito ............................... 235/492

* cited by examiner

*Primary Examiner*—Jamara A Franklin
(74) *Attorney, Agent, or Firm*—Thomas, Kayden, Horstemeyer & Risley, LLP

(57) ABSTRACT

A TV card with power-switching function is provided. The TV card comprises a TV card chip module, a power-switching module and a connecting interface. The power switching module is connected to the TV card chip module to transfer or block a power to the TV card chip module; the connecting interface is connected to the power-switching module and a host, wherein the host provides the power to the power-switching module through the connecting interface; the connecting interface further comprises a reserved pin to receive and transfer a switching signal to the power-switching module through the connecting interface to enable the power-switching module to transfer or block the power to the TV card chip module.

10 Claims, 1 Drawing Sheet

TV CARD WITH POWER-SWITCHING FUNCTION

RELATED APPLICATIONS

This application claims priority to Taiwan Application Serial Number 96146609, filed Dec. 6, 2007, which is herein incorporated by reference.

BACKGROUND

1. Field of Invention

The present invention relates to a TV card. More particularly, the present invention relates to a TV card with a power-switching function.

2. Description of Related Art

Electronic entertainment devices have become more and more important due to an increase in leisure time of people. The convenience of TV cards has made them an indispensable part of electronic entertainment. Laptops with a built-in TV card have also become increasingly popular.

Batteries usually provide power to laptops. However batteries have a limited amount of power making the power-saving design for each laptop device important. Conventional TV cards stay in standby mode even if they are not in use. The power is still dissipated in standby mode. Thus, the batteries soon run out of power due to the waste in standby mode.

Accordingly, what is needed is to design a switch in the TV cards to block the power dissipation in standby mode to overcome the above issues. The present invention addresses such a need.

SUMMARY

The invention provides a TV card with power-switching function comprising: a TV card chip module, a power-switching module and a connecting interface. The power-switching module connects the TV card chip module to transfer or block a power to the TV card chip module; the connecting interface comprises a plurality of pins, wherein the connecting interface connects the power-switching module and a host. The host provides the power to the power-switching module through the connecting interface. The connecting interface further comprises a reserved pin to receive and transfer a switching signal to the power-switching module through the connecting interface to enable the power-switching module to transfer or block the power to the TV card chip module.

Another object of the present invention is to provide a TV card with power-switching function comprising: a TV card chip module; a power-switching module, a connecting interface and a cable. The power-switching module connects the TV card chip module to transfer or block a power to the TV card chip module; the connecting interface connects the power-switching module and a host. The host provides the power to the power-switching module through the connecting interface. The cable connects the power-switching module to receive a switching signal and transfer the switching signal to the power-switching module to enable the power-switching module to transfer or block the power to the TV card chip module.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
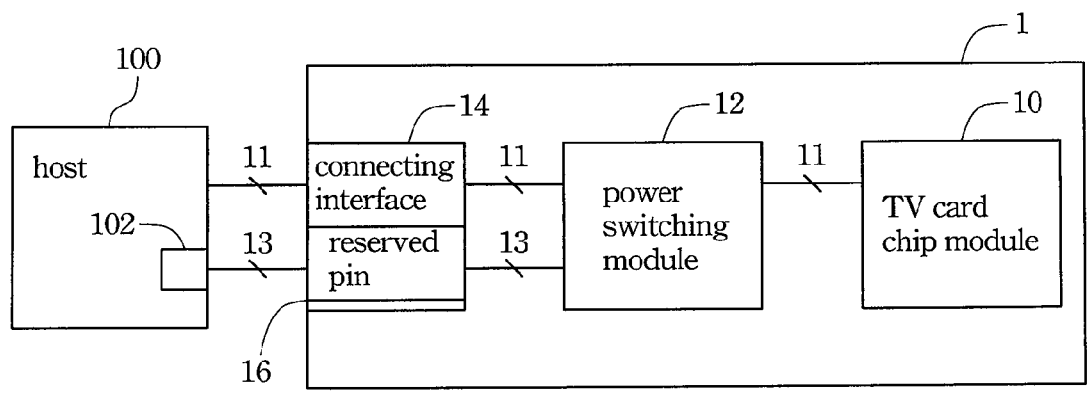
FIG. 1 is a block diagram of the TV card and the host of the first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Please refer to FIG. 1. FIG. 1 is a block diagram of the TV card 1 and the host 100 of the first embodiment of the present invention. The TV card 1 is, but not necessarily, a mini card. The TV card 1 comprises a TV card chip module 10, a power-switching module 12 and a connecting interface 14. The power-switching module 12 connects the TV card chip module 10 to transfer or block the power 11 to the TV card chip module 10. The connecting interface 24 is a peripheral component interconnect express or a universal Serial Bus interface. The connecting interface 24 comprises a plurality of pins (not shown) and connects the power-switching module 12 and the host 100. Information is also transferred between the connecting interface 14 and the TV card chip module 10, the host 100 provides the power 11 to the power-switching module 12 through the connecting interface 14; the connecting interface 14 further comprises a reserved pin 16 connected to a switch 102 in the host 100. The switch 102 generates a switching signal 13. The reserved pin 16 of the connecting interface 14 receives the switching signal 13 and transfer the switching signal 13 to the power-switching module 12 through the connecting interface 14 to enable the power-switching module 12 to transfer or block the power to the TV card chip module 10. In another embodiment, the switching signal 13 is generated by an application program (not shown) of the host 100 and is transferred to the reserved pin 16 of the connecting interface 14 through the host 100. The reserved pin 16 further transfers the switching signal 13 to the power-switching module 12 through the connecting interface 14 to enable the power-switching module 12 to transfer or block the power to the TV card chip module 10.

The pins of the connecting interface 14 are listed in the following table:

TABLE 1

| | | | |
|---|---|---|---|
| 51 | NC | 52 | +3.3Vaux |
| 49 | NC | 50 | GND |
| 47 | NC | 48 | +1.5 V |
| 45 | NC | 46 | NC |
| 43 | GND | 44 | NC |
| 41 | +3.3Vaux | 42 | NC |
| 39 | +3.3Vaux | 40 | GND |
| 37 | GND | 38 | USB_D+ |
| 35 | GND | 36 | USB_D− |
| 33 | PETp0 | 34 | GND |
| 31 | PETn0 | 32 | NC |
| 29 | GND | 30 | NC |
| 27 | GND | 28 | +1.5 V |
| 25 | PERp0 | 26 | GND |
| 23 | PERn0 | 24 | 3.3 Vaux |

TABLE 1-continued

| | | | |
|---|---|---|---|
| 21 | GND | 22 | PERST# |
| 19 | NC | 20 | NC |
| 17 | NC | 18 | GND |
| 15 | GND | 16 | NC |
| 13 | REFCLK+ | 14 | NC |
| 11 | REFCLK- | 12 | NC |
| 9 | GND | 10 | NC |
| 7 | CLKREQ# | 8 | NC |
| 5 | NC | 6 | 1.5 V |
| 3 | NC | 4 | GND |
| 1 | WAKE# | 2 | 3.3Vaux |

The reserved pins are the "NC", e.g. the 3, 5, 8, 10 pins, of the above table. These pins can serve as the reserved pin 16 of the first embodiment.

The TV card 1 of the first embodiment can receive the switching signal 13 through the reserved pin 16 of the connecting interface 14 and transfer the switching signal 13 to the power switching module 12. Therefore, power to the TV card is blocked if the TV card is not in use. There will not be additional power dissipation during the standby mode.

Figure 2:
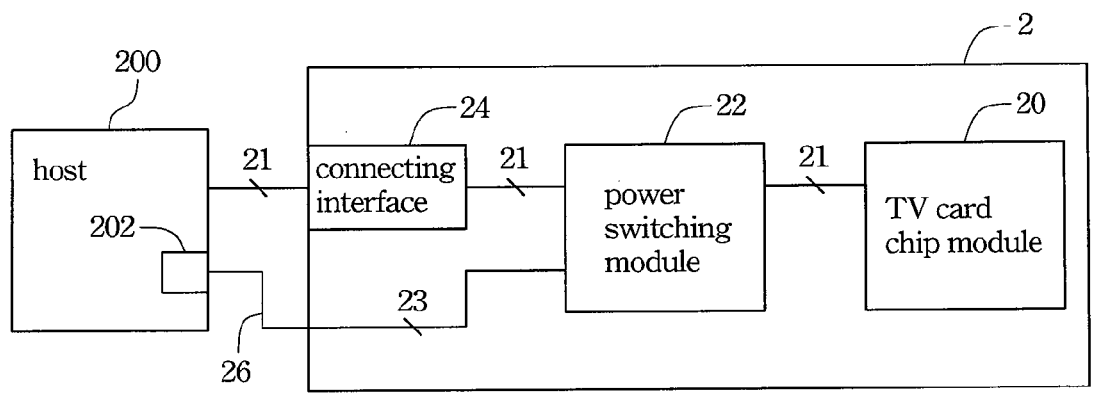
FIG. 2 is a block diagram of the TV card and the host of the second embodiment of the present invention.

The second embodiment of the present invention is shown in FIG. 2. FIG. 2 is a block diagram of the TV card 2 and the host. The TV card 2 is, but not necessarily, a mini card. The TV card 2 comprises a TV card chip module 20, a power-switching module 22, a connecting interface 24 and a cable 26. The power-switching module 22 connects the TV card chip module 20 to transfer or block power 21 to the TV card chip module 20. The connecting interface 24 is a peripheral component interconnect express or a universal Serial Bus interface. The connecting interface 24 connects the power-switching module 22 and the host 200. Information is also transferred between the connecting interface 24 and the TV card chip module 20, the host 200 provides power 21 to the power-switching module 22 through the connecting interface 24; The cable 26 connects the power-switching module 22 and a switch 202 in the host 200, receives a switching signal 23 generated by the switch 202 and transfers the switching signal 23 to the power-switching module 22 to enable the power-switching module to transfer or block power 21 to the TV card chip module 20. In another embodiment, the switching signal 23 is generated by an application program (not shown) of the host 200 and is transferred to the cable 26. The cable 26 further transfers the switching signal 23 to the power-switching module 22 to enable the power-switching module 22 to transfer or block the power to the TV card chip module 20.

Figure 3:
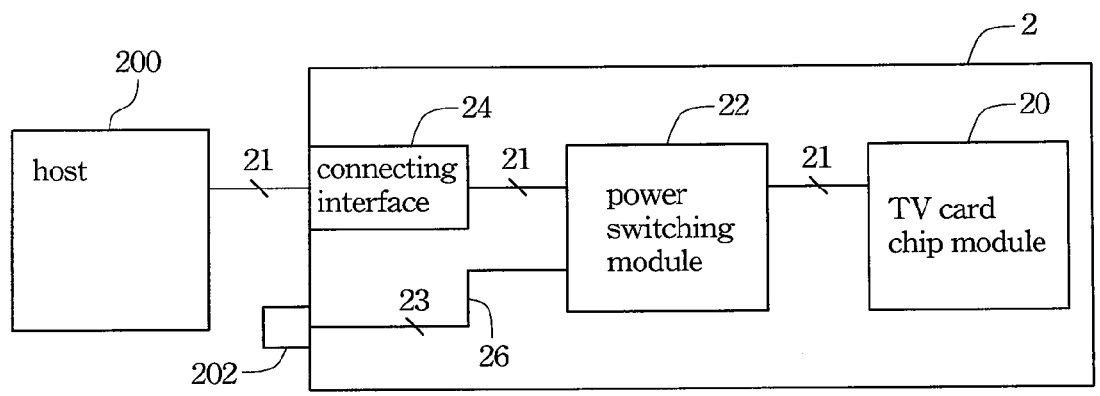
FIG. 3 is a block diagram of the TV card and the host of the third embodiment of the present invention.

In another embodiment, the switch 200 can be placed not in the host 200 but on the TV card 2 as depicted in FIG. 3. The other components of the TV card are the same with the second embodiment. People skilled in this field can easily understand how to combine the above arrangement. Thus the detail is not described here.

The TV card 2 of the second embodiment can receive the switching signal 23 through the cable 26 and transfer the switching signal 23 to the power switching module 22. Therefore, power to the TV card is blocked if the TV card is not in use. There will not be additional power dissipation during the standby mode.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A TV card with power-switching function comprising:
   a TV card chip module;
   a power-switching module connected to the TV card chip module for transferring or blocking a power to the TV card chip module; and
   a connecting interface comprising a plurality of pins, wherein the connecting interface is connected to the power-switching module and a host; the host provides the power to the power-switching module through the connecting interface; the connecting interface further comprises a reserved pin for receiving and transferring a switching signal to the power-switching module through the connecting interface to enable the power-switching module to transfer or block the power to the TV card chip module, wherein the power is blocked during a standby mode when the TV card chip module is not in use, and the TV card chip module will not have additional power dissipation when the power is blocked.

2. The TV card of claim 1, wherein the TV card is a mini card.

3. The TV card of claim 1, wherein the connecting interface is a peripheral component interconnect express or a universal Serial Bus interface.

4. The TV card of claim 1, wherein the reserved pin is further connected to a switch, wherein the switching signal is generated by the switch.

5. The TV card of claim 1, wherein the reserved pin is further connected to a host, wherein the switching signal is generated by an application program of the host and is transferred to the reserved pin through the host.

6. A TV card with power-switching function comprising:
   a TV card chip module;
   a power-switching module connected to the TV card chip module for transferring or blocking a power to the TV card chip module;
   a connecting interface connected to the power-switching module and a host;
   wherein the host provides the power to the power-switching module through the connecting interface; and
   a cable connected to the power-switching module for receiving a switching signal and transferring the switching signal to the power-switching module to enable the power-switching module to transfer or block the power to the TV card chip module, wherein the power is blocked during a standby mode when the TV card chip module is not in use, and the TV card chip module will not have additional power dissipation when the power is blocked.

7. The TV card of claim 6, wherein the TV card is a mini card.

8. The TV card of claim 6, wherein the connecting interface is a peripheral component interconnect express or a universal Serial Bus interface.

9. The TV card of claim 6, wherein the cable is further connected to a switch, wherein the switching signal is generated by the switch.

10. The TV card of claim 6, wherein the cable is further connected to a host, wherein the switching signal is generated by an application program of the host and is transferred to the reserved pin through the host.

* * * * *